(12) United States Patent
Tseng et al.

(10) Patent No.: US 12,263,458 B2
(45) Date of Patent: Apr. 1, 2025

(54) CHEMICAL SOLUTION PREPARATION SYSTEM AND METHOD

(71) Applicant: CHANGXIN MEMORY TECHNOLOGIES, INC., Hefei (CN)

(72) Inventors: Po-Chang Tseng, Hefei (CN); Chang-Yi Tsai, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 729 days.

(21) Appl. No.: 17/452,785

(22) Filed: Oct. 29, 2021

(65) Prior Publication Data

US 2023/0020982 A1    Jan. 19, 2023

Related U.S. Application Data

(63) Continuation of application No. PCT/CN2021/110041, filed on Aug. 2, 2021.

(30) Foreign Application Priority Data

Jul. 13, 2021    (CN) .......................... 202110791898.9

(51) Int. Cl.
*B01F 35/21*    (2022.01)
*B01F 23/232*    (2022.01)
(Continued)

(52) U.S. Cl.
CPC .......... *B01F 33/811* (2022.01); *B01F 23/232* (2022.01); *B01F 35/2132* (2022.01); *B01F 35/71805* (2022.01); *B01F 2101/2204* (2022.01)

(58) Field of Classification Search
CPC .. B01F 33/811; B01F 23/232; B01F 35/2132; B01F 35/71805; B01F 2101/2204; G05D 11/132
(Continued)

(56) References Cited

U.S. PATENT DOCUMENTS

| 4,678,119 A | 7/1987 | Doyle |
| 6,565,422 B1 * | 5/2003 | Homma .................. B24B 37/04 451/60 |

(Continued)

FOREIGN PATENT DOCUMENTS

| CN | 102102770 A | 6/2011 |
| CN | 103090190 A | 5/2013 |

(Continued)

OTHER PUBLICATIONS

International Search Report cited in PCT/CN2021/110041, mailed Apr. 13, 2022, 11 pages.

*Primary Examiner* — Huy Tram Nguyen
(74) *Attorney, Agent, or Firm* — Kilpatrick Townsend & Stockton LLP

(57) ABSTRACT

The present disclosure provides a chemical solution preparation system and method. The chemical solution preparation system includes: a first mixing system, configured to mix a first chemical solution and a first diluent to obtain a first mixture; a second mixing system, configured to mix a second chemical solution and a second diluent to obtain a second mixture; a third mixing system, configured to mix the first mixture, the second mixture, and a third diluent to obtain a third mixture; an output system, configured to output the third mixture to a spray apparatus of the chemical mechanical polishing device; a sampling system, configured to collect a sample of the third mixture output from the output system; and a monitoring system, configured to monitor a status of the first mixture, a status of the second mixture, and a status of the third mixture.

17 Claims, 4 Drawing Sheets

(51) Int. Cl.
  *B01F 33/81*  (2022.01)
  *B01F 35/71*  (2022.01)
  *B01F 101/00* (2022.01)

(58) Field of Classification Search
  USPC ........................................... 422/225
  See application file for complete search history.

(56) References Cited

U.S. PATENT DOCUMENTS

| | | |
|---|---|---|
| 2003/0174306 A1 | 9/2003 | Grant et al. |
| 2013/0067998 A1 | 3/2013 | Mohseni et al. |
| 2020/0269200 A1 | 8/2020 | Hsu et al. |

FOREIGN PATENT DOCUMENTS

| | | |
|---|---|---|
| CN | 204147826 U | 2/2015 |
| CN | 204841441 U | 12/2015 |
| CN | 209417007 U | 9/2019 |
| CN | 209485838 U | 10/2019 |
| CN | 111081586 A | 4/2020 |
| CN | 111604807 A | 9/2020 |
| CN | 112881543 A | 6/2021 |
| TW | 201544241 A | 12/2015 |

* cited by examiner

CHEMICAL SOLUTION PREPARATION SYSTEM AND METHOD

CROSS-REFERENCE TO RELATED APPLICATIONS

This is a continuation of International Application No. PCT/CN2021/110041, filed on Aug. 2, 2021, which claims the priority to Chinese Patent Application No. 202110791898.9, titled "CHEMICAL SOLUTION PREPARATION SYSTEM AND METHOD" and filed on Jul. 13, 2021. The entire contents of International Application No. PCT/CN2021/110041 and Chinese Patent Application No. 202110791898.9 are incorporated herein by reference.

TECHNICAL FIELD

The present disclosure relates to, but is not limited to, a chemical solution preparation system and method.

BACKGROUND

A chemical solution cleaning device may adopt a chemical mechanical polishing (CMP) cleaning mode. A CMP cleaning technology is used for leveling a surface of a semiconductor product such as a wafer by using a chemical solution in combination with mechanical force. Different chemical solution mixtures can be selected according to materials of semiconductor products. The mechanical force is mainly used for cleaning a surface of a semiconductor product by using deionized water (DIW), a cleaning brush, or gas.

During working, two active rollers of the chemical solution cleaning device drive a semiconductor material to rotate, and a brush rotates in a direction opposite to a rotation direction of a semiconductor product and moves towards the semiconductor product to clamp the semiconductor product. Deionized water and a mixture of chemical solutions are simultaneously sprayed from a spray pipe on the chemical solution cleaning device to the semiconductor product. In this way, foreign matters can be efficiently removed through a combination of mechanical brushing and chemical cleaning.

Because a concentration of a chemical solution is relatively high, the chemical solution needs to be diluted to satisfy a required concentration or pH value, so as to clean a corresponding semiconductor product.

SUMMARY

An overview of the subject matter detailed in the present disclosure is provided below, which is not intended to limit the protection scope of the claims.

A first aspect of the present disclosure provides a chemical solution preparation system, wherein the chemical solution preparation system is disposed inside a chemical mechanical polishing device, and includes:

a first mixing system, configured to mix a first chemical solution and a first diluent according to a first preset ratio to obtain a first mixture;

a second mixing system, configured to mix a second chemical solution and a second diluent according to a second preset ratio to obtain a second mixture;

a third mixing system, connected to the first mixing system and the second mixing system, respectively, where the third mixing system is configured to mix the first mixture, the second mixture, and a third diluent according to a third preset ratio to obtain a third mixture;

an output system, configured to output the third mixture to a spray apparatus of the chemical mechanical polishing device;

a sampling system, configured to collect a sample of the third mixture output from the output system, where the sampling system is a branch system communicated with the output system; and a monitoring system, configured to monitor a status of the first mixture, a status of the second mixture, and a status of the third mixture.

A second aspect of the present disclosure provides a chemical solution preparation method, the chemical solution preparation method including:

mixing a first chemical solution and a first diluent in a first mixing system according to a first preset ratio to obtain a first mixture;

mixing a second chemical solution and a second diluent in a second mixing system according to a second preset ratio to obtain a second mixture;

mixing the first mixture, the second mixture, and a third diluent in a third mixing system according to a third preset ratio to obtain a third mixture;

outputting the third mixture to a spray apparatus of a chemical mechanical polishing device by using an output system;

collecting, by using a sampling system, a sample of the third mixture output from the output system, where the sampling system is a branch system communicated with the output system; and monitoring a status of the first mixture, a status of the second mixture, and a status of the third mixture by using a monitoring system.

Other aspects of the present disclosure are understandable upon reading and understanding the accompanying drawings and detailed description.

BRIEF DESCRIPTION OF THE DRAWINGS

The accompanying drawings incorporated into the specification and constituting a part of the specification illustrate embodiments of the present disclosure, and are used to explain the principles of the embodiments of the present disclosure together with the description. In these accompanying drawings, similar reference numerals are used to represent similar elements. The accompanying drawings in the following description show merely some rather than all of the embodiments of the present disclosure. Persons skilled in the art may derive other accompanying drawings from these accompanying drawings without creative efforts.

DETAILED DESCRIPTION

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons skilled in the art based on the embodiments in the present disclosure without creative efforts shall fall within the protection scope of the present disclosure. It should be noted that the embodiments in the present disclosure and features in the embodiments may be combined with each other in a non-conflicting manner.

The present disclosure provides a chemical solution preparation system. The system is disposed inside a CMP device. In the preparation system that can be used for mixing multiple chemical solutions, after multiple chemical solutions are mixed according to a preset ratio, a mixture of the chemical solutions obtained after mixing is output to a spray apparatus of the CMP device by using an output system, to spray the mixture by using the spray apparatus to clean a to-be-cleaned semiconductor product to remove foreign matters. The chemical solution preparation system may further include a sampling system to collect a sample of the mixture output from the output system, to determine whether the mixture satisfies a cleaning requirement for cleaning the to-be-cleaned semiconductor product. The sampling system can be used as a branch system of the output system, or in other words, when collecting a sample of the mixture, the sampling system does not affect mixture output conducted by the output system, and does not affect the cleaning of the to-be-cleaned semiconductor product either. The chemical solution preparation system may further include a monitoring system. The monitoring system is configured to monitor a status of the mixture to learn the status of the mixture in time. According to the chemical solution preparation system provided in the present disclosure, the sampling system is disposed in a form of a branch system to collect a sample of the mixture for cleaning the to-be-cleaned semiconductor product, to learn parameter information related to components in the mixture in time to adjust the components in the mixture in time. The mixture is monitored to learn a concentration and/or a pH value of the mixture in time to determine whether the concentration and/or the pH value of the mixture satisfy/satisfies the cleaning requirement. This improves the accuracy of preparing a chemical solution by the CMP device, thereby improving a product yield.

Figure 1:
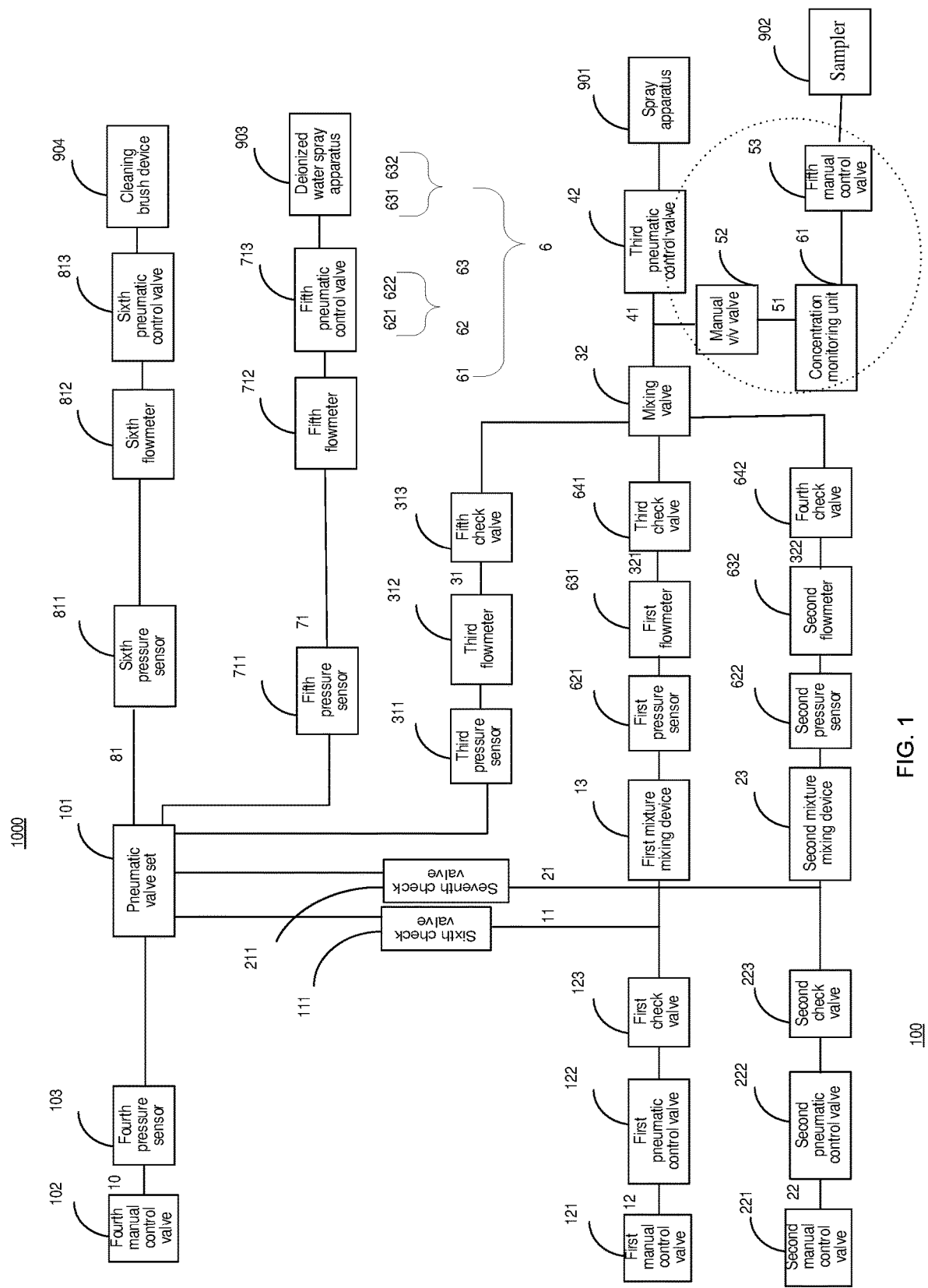
FIG. 1 is a schematic diagram of a cleaning solution preparation system according to an exemplary embodiment.

The present disclosure provides a chemical solution preparation system. FIG. 1 is a schematic diagram of a chemical solution preparation system according to an exemplary embodiment. The chemical solution preparation system 100 is disposed in a CMP device 1000. The chemical solution preparation system 100 includes a first mixing system 1, a second mixing system 2, a third mixing system 3, an output system 4, a sampling system 5, and a monitoring system 6.

The first mixing system 1 is configured to mix a first chemical solution and a first diluent according to a first preset ratio to obtain a first mixture.

The second mixing system 2 is configured to mix a second chemical solution and a second diluent according to a second preset ratio to obtain a second mixture.

The third mixing system 3 is configured to mix the first mixture, the second mixture, and a third diluent according to a third preset ratio to obtain a third mixture.

The output system 4 is configured to output the third mixture to a spray apparatus of the CMP device.

The sampling system 5 is configured to collect a sample of the third mixture output from the output system, where the sampling system is a branch system communicated with the output system.

The monitoring system 6 is configured to monitor statuses of the first mixture, the second mixture, and the third mixture.

According to the chemical solution preparation system provided in the present disclosure, the sampling system is disposed in a form of a branch system to collect a sample of the third mixture from the output system to learn parameter information related to components in the third mixture, for example, collects a sample of the third mixture to determine whether the components in the third mixture satisfies a cleaning requirement for cleaning a to-be-cleaned semiconductor product, so as to adjust the components in the third mixture in time to satisfy the cleaning requirement.

As shown in FIG. 1, after the first mixture and the second mixture are mixed by using the third mixing system to form the third mixture, the third mixture is directly output to the spray apparatus 901 of the CMP device 1000 by using the output system. At this stage, a concentration and/or a pH value of the third mixture need/needs to be monitored to learn the concentration and/or the pH value of the third mixture in time. When the concentration and/or the pH value of the third mixture do/does not satisfy the cleaning requirement for cleaning the to-be-cleaned semiconductor product, a prompt or an alert is provided in time. To avoid impact on the output of the third mixture on a main path from the output system to the spray apparatus 901 of the CMP device 1000, the monitoring system is disposed on the sampling system used as a branch system to detect and learn in time the concentration and/or the pH value of the third mixture, to determine whether the concentration and/or the pH value of the third mixture satisfy/satisfies the cleaning requirement. This improves the accuracy of preparing a chemical solution by the CMP device 1000, thereby improving a product yield.

Figure 2:
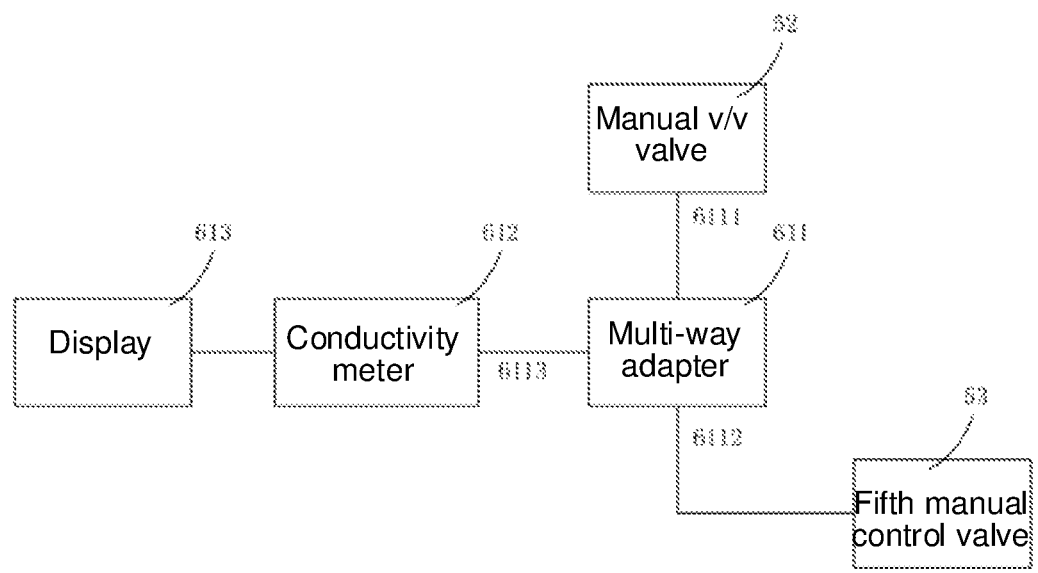
FIG. 2 is a schematic diagram of an example of a concentration monitoring unit in a monitoring system in FIG. 1.

In the chemical solution preparation system provided in the present disclosure, the monitoring system 6 may include a concentration monitoring unit 61. With reference to FIG. 1 and FIG. 2, FIG. 2 is a schematic diagram of an example of a concentration monitoring unit in the monitoring system 6 in FIG. 1. FIG. 2 is a schematic diagram of an example of the concentration monitoring unit 61 in a dashed in FIG. 1.

The concentration monitoring unit 61 may include a multi-way adapter 611, a conductivity meter 612, and a display 613. The multi-way adapter 611 is disposed on the sampling system 5, that is, disposed on the branch system, and is communicated with the branch system. The conductivity meter 612 is inserted into the multi-way adapter 611 to monitor the concentration and/or the pH value of the third mixture in the branch system. The display 613 is electrically connected to the conductivity meter 612 and is configured to display a monitoring result of the conductivity meter 612.

The multi-way adapter 611 may be, for example, a three-way adapter. A first channel 6111 and a second channel 6112 are disposed on the branch system to be communicated with the branch system, and a third channel 6113 is inserted with the conductivity meter 612.

A probe of the conductivity meter 612 is inserted into the third channel 6113 and is in contact with the third mixture to obtain the concentration and/or the pH value of the third mixture. The other end that is of the conductivity meter 612 and that is opposite to the probe is connected to the display 613, to display the obtained concentration and/or pH value of the third mixture on the display 613.

The display 613 may alternatively communicate with a control device, for example, the display 613 may communicate with the control device by connecting to an RS485 port, to display the obtained concentration and/or pH value or other information of the third mixture on the display 613 according to an instruction of the control device. The other information, for example, current environment temperature, a current time, and a currently output current, may be displayed as required.

In the chemical solution preparation system provided in the present disclosure, if the concentration and/or the pH value of the third mixture monitored by the concentration monitoring unit 61 in the monitoring system 6 are/is not within a preset range, the concentration monitoring unit 61 may give an alarm and record a time. The concentration monitoring unit accurately monitors the quality of a cleaned semiconductor product based on the recorded time and the correspondingly cleaned semiconductor product, thereby improving a product yield.

Figure 3:
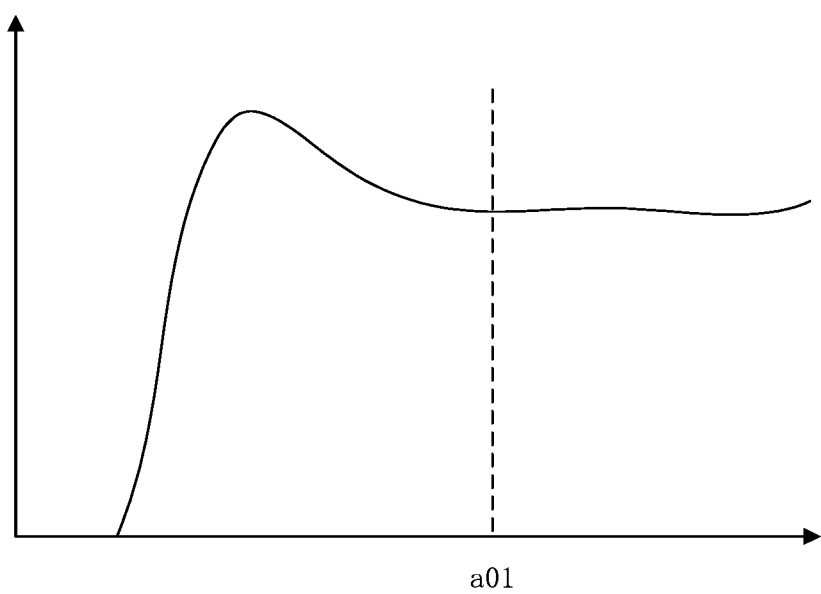
FIG. 3 is a tendency chart of an example of a pH value of a third mixture.

To accurately monitor the concentration and/or the pH value of the third mixture, the monitoring may be conducted after the concentration and/or the pH value of the third mixture are/is relatively stable. The pH value of the third mixture is used as an example. FIG. 3 is a tendency chart of an example of a pH value of a third mixture. In FIG. 3, an x-axis represents time and indicates output time of a chemical solution and a diluent; and a vertical axis represents a pH value. It can be seen from FIG. 3 that the pH value of the third mixture rapidly rises at an initial stage, and then gradually drops to a stable state, or in other words, after a dotted line a01 in the figure, the pH value of the third mixture is still in a stable state. At the rapidly rising stage of the pH value of the third mixture, the chemical solution is being mixed. Then, the pH value gradually drops, it indicates that the pH value of the third mixture gradually gets close to a preset pH value after the chemical solution and the diluent at a preset ratio are gradually mixed. After the pH value of the third mixture reaches the dotted line a01, the chemical solution and the diluent are fully mixed, and the pH value of the third mixture falls within a preset pH value range. The third mixture in this period may be used for cleaning a to-be-cleaned semiconductor product, and the third mixture available for cleaning needs to be monitored to determine whether the pH value of the third mixture is always within the preset pH value range. If the pH value of the third mixture is always within the preset pH value range, it indicates that the pH value of the third mixture satisfies a cleaning requirement, and the third mixture can continue to be used for cleaning the to-be-cleaned semiconductor product. If the pH value of the third mixture is not always within the preset pH value range, it indicates that the pH value of the third mixture does not satisfy the cleaning requirement, and the third mixture cannot continue to be used for cleaning the to-be-cleaned semiconductor product. In this case, an alarm prompt is given to indicate a reason why the chemical solution preparation system needs to be shut down to conduct inspection. For example, pressure, flow, and mixing time during mixing the first chemical solution, mixing the second chemical solution, and mixing the first mixture and the second mixture are inspected, to determine a reason why the problem occurs to adjust and correct the problem in time, thereby improving the cleaning quality of the to-be-cleaned semiconductor product.

In the chemical solution preparation system provided in the present disclosure, as shown in FIG. 1, the monitoring system 6 may further include a pressure monitoring unit 62 and a flow monitoring unit 63. The pressure monitoring unit 62 and the flow monitoring unit 63 are disposed on the third mixing system 3. The pressure monitoring unit 62 includes at least one first pressure sensor 621 configured to monitor pressure of the first mixture, at least one second pressure sensor 622 configured to monitor pressure of the second mixture, and at least one third pressure sensor 311 configured to monitor pressure of the third diluent. The flow monitoring unit 63 includes at least one first flowmeter 631 configured to monitor flow of the first mixture, at least one second flowmeter 632 configured to monitor flow of the second mixture, and at least one third flowmeter 312 configured to monitor flow of the third diluent.

The first pressure sensor 621 and the first flowmeter 631 are disposed on a pipeline that is of the third mixing system 3 and that is connected to the first mixing system, and the first pressure sensor 621 and the first flowmeter 631 may be successively disposed along a transportation direction of the first mixture. The first pressure sensor 621 is configured to monitor the pressure of the first mixture flowing into the third mixing system 3, and the first flowmeter 631 is configured to monitor the flow of the first mixture flowing into the third mixing system 3, so as to monitor a status, for example, the pressure and the flow, of the first mixture flowing into the third mixing system 3, to ensure that the first mixture flowing into the third mixing system 3 satisfies a preset requirement.

The second pressure sensor 622 and the second flowmeter 632 are disposed on a pipeline that is of the third mixing system 3 and that is connected to the second mixing system, and the second pressure sensor 622 and the second flowmeter 632 may be successively disposed along a transportation direction of the second mixture. The second pressure sensor 622 is configured to monitor the pressure of the second mixture flowing into the third mixing system 3, and the second flowmeter 632 is configured to monitor the flow of the second mixture flowing into the third mixing system 3, so as to monitor a status, for example, the pressure and the flow, of the second mixture flowing into the third mixing system 3, to ensure that the second mixture flowing into the third mixing system 3 satisfies the preset requirement.

The third pressure sensor 311 and the third flowmeter 312 are disposed on a third diluent output pipeline that is of the third mixing system 3 and that is connected to the third mixing system, and the third pressure sensor 311 and the third flowmeter 312 may be successively disposed along a transportation direction of the third diluent. The third pressure sensor 311 is configured to monitor the pressure of the third diluent flowing into the third mixing system 3, and the third flowmeter 312 is configured to monitor the flow of the third diluent flowing into the third mixing system 3, so as to monitor a status, for example, the pressure and the flow, of the third diluent flowing into the third mixing system 3, to ensure that the third diluent flowing into the third mixing system 3 satisfies the preset requirement.

By monitoring the statuses, for example, the pressure and the flow, of the first mixture, the second mixture, and the third diluent flowing into the third mixing system 3, it can be ensured that the first mixture, the second mixture, and the third diluent are mixed in the third mixing system 3 according to the preset requirement to form the third mixture, to further ensure that the third mixture satisfies the cleaning requirement for cleaning the to-be-cleaned semiconductor product.

In the chemical solution preparation system provided in the present disclosure, the output system 4 includes a first output pipeline 41, one end of the first output pipeline 41 is communicated with the third mixing system 3, and the other end of the first output pipeline is communicated with the spray apparatus 901 of the CMP device 1000, and is used for outputting the third mixture to the spray apparatus 901 to clean the to-be-cleaned semiconductor product. A third pneumatic control valve 42 may be disposed on the first output pipeline 41 to control flow of the third mixture in the first output pipeline 41.

The sampling system 5 may include a second output pipeline 51, one end of the second output pipeline 51 is communicated with the first output pipeline 41, and the other end of the second output pipeline is communicated with a sampler 902. The second output pipeline 51 is used as a branch pipeline of the first output pipeline 41. The second output pipeline used as a branch pipeline is used for collecting a sample of the third mixture without affecting output of the third mixture in the first output pipeline 41. The chemical solution preparation system provided in the present disclosure not only ensures the output of the third mixture in the first output pipeline, but also can collect a sample of the third mixture in the first output pipeline in real time.

The concentration monitoring unit 61 in the monitoring system 6 may be disposed on the second output pipeline. As shown in FIG. 2, the first channel 6111 and the second channel 6112 of the three-way adapter of the concentration monitoring unit 61 are disposed on the second output pipeline to be communicated with the second output pipeline. The probe of the conductivity meter 612 is inserted into the third channel 6113 and is in contact with the third mixture to obtain the concentration and/or the pH value of the third mixture. The other end that is of the conductivity meter 612 and that is opposite to the probe is connected to the display 613, to display the obtained concentration and/or pH value of the third mixture on the display 613.

In the chemical solution preparation system provided in the present disclosure, the first diluent, the second diluent, and the third diluent may be the same or different. When the first diluent, the second diluent, and the third diluent are the same, the first diluent, the second diluent, and the third diluent may all be deionized water.

In the chemical solution preparation system provided in the present disclosure, the first mixing system 1 includes a first diluent output pipeline 11, a first chemical solution output pipeline 12, and a first mixture mixing device 13. A first manual control valve 121 and a first pneumatic control valve 122 are successively disposed on the first chemical solution output pipeline 12 along a flow direction of the first chemical solution.

The first diluent output pipeline 11 and the first chemical solution output pipeline 12 are communicated with the first mixture mixing device 13. A communication mode may be set as required. For example, as shown in FIG. 1, the first diluent output pipeline 11 may be connected to the first chemical solution output pipeline 12, such that the first diluent and the first chemical solution converge on the first chemical solution output pipeline 12, and then are input into the first mixture mixing device 13. Alternatively, both the first diluent output pipeline 11 and the first chemical solution output pipeline 12 are connected to the first mixture mixing device 13, such that the first diluent and the first chemical solution converge and are mixed in the first mixture mixing device 13.

The first manual control valve 121 disposed on the first chemical solution output pipeline 12 is configured to control the opening and closing of the first chemical solution output pipeline 12 to control whether to input the first chemical solution. The first pneumatic control valve 122 disposed on the first chemical solution output pipeline 12 is configured to control output flow of the first chemical solution on the first chemical solution output pipeline 12 to control the first chemical solution and the first diluent to be mixed according to the first preset ratio, to obtain the first mixture.

In the chemical solution preparation system provided in the present disclosure, the second mixing system 2 includes a second diluent output pipeline 21, a second chemical solution output pipeline 22, and a second mixture mixing device 23. A second manual control valve 221 and a second pneumatic control valve 222 are successively disposed on the second chemical solution output pipeline 22 along a flow direction of the second chemical solution.

The second diluent output pipeline 21 and the second chemical solution output pipeline 22 are communicated with the second mixture mixing device 23. A communication mode may be set as required. For example, as shown in FIG. 1, the second diluent output pipeline 21 may be connected to the second chemical solution output pipeline 22, such that the second diluent and the second chemical solution converge on the second chemical solution output pipeline 22, and then are input into the second mixture mixing device 23. Alternatively, both the second diluent output pipeline 21 and the second chemical solution output pipeline 22 are connected to the second mixture mixing device 23, such that the second diluent and the second chemical solution converge and are mixed in the second mixture mixing device 23.

The second manual control valve 221 disposed on the second chemical solution output pipeline 22 is configured to control the opening and closing of the second chemical solution output pipeline 22 to control whether to input the second chemical solution. The second pneumatic control valve 222 disposed on the second chemical solution output pipeline 22 is configured to control output flow of the second chemical solution on the second chemical solution output pipeline 22 to control the second chemical solution and the second diluent to be mixed according to the second preset ratio, to obtain the second mixture.

In the chemical solution preparation system provided in the present disclosure, as shown in FIG. 1, the third mixing system 3 includes a third diluent output pipeline 31 and a mixing valve 32; the mixing valve 32 is communicated with the third diluent output pipeline 31; and the mixing valve 32 is communicated with the first mixture mixing device 13 and the second mixture mixing device 23. The third mixing system may further include a first mixture output pipeline 321 and a second mixture output pipeline 322. The mixing valve 32 may be communicated with the first mixture mixing device 13 through the first mixture output pipeline 321, and communicated with the second mixture mixing device 23 through the second mixture output pipeline 322; and the third mixing system 3 is configured to mix the first mixture and the second mixture with the third diluent to obtain the third mixture for cleaning the to-be-cleaned semiconductor product.

To monitor pressure and flow of the first mixture flowing into the mixing valve 32, a first pressure sensor 621 and a first flowmeter 631 are disposed on the first mixture output pipeline 321. To monitor pressure and flow of the second mixture flowing into the mixing valve 32, a second pressure sensor 622 and a second flowmeter 632 are disposed on the second mixture output pipeline 322. To monitor pressure and flow of the third diluent flowing into the mixing valve 32, a third pressure sensor 311 and a third flowmeter 312 are disposed on the third diluent output pipeline 31.

In the chemical solution preparation system provided in the present disclosure, the pressure sensors and the flowmeters are respectively disposed on the first mixture output pipeline 321, the second mixture output pipeline 322, and the third diluent output pipeline to monitor the flow and the pressure on the pipelines to learn statuses on the output pipelines in real time, to improve the accuracy and quality of chemical solution preparation.

In the chemical solution preparation system provided in the present disclosure, when the first diluent, the second diluent, and the third diluent are the same, the first diluent output pipeline 11, the second diluent output pipeline 21, and the third diluent output pipeline 31 are communicated with a diluent output pipeline 10 through a pneumatic valve set 101. As shown in FIG. 1, the diluent output pipeline 10 is communicated with all of the first diluent output pipeline 11, the second diluent output pipeline 21, and the third diluent output pipeline 31 through the pneumatic valve set 101. To control output of a diluent, a manual control valve 102 may be disposed on the diluent output pipeline 10 to control the opening and closing of the diluent output pipeline 10.

In the chemical solution preparation system provided in the present disclosure, as shown in FIG. 1, the first mixing system 1 includes the first chemical solution output pipeline 12, the first diluent output pipeline 11, and the first mixture mixing device 13, and the first manual control valve 121 and the first pneumatic control valve 122 are disposed on the first chemical solution output pipeline 12. The first manual control valve 121 controls the opening and closing of the first chemical solution output pipeline 12 to control whether to input the first chemical solution. The first pneumatic control valve 122 is configured to control the flow of the first chemical solution on the first chemical solution output pipeline 12. The first diluent output pipeline 11 is connected to the first chemical solution output pipeline 12, such that the first diluent and the first chemical solution converge on the first chemical solution output pipeline 12. To avoid liquid backflow, a first check valve 123 is disposed between the first pneumatic control valve 122 and a jointed part between the first diluent output pipeline 11 and the first chemical solution output pipeline 12. The converging first diluent and first chemical solution are transported to the first mixture mixing device 13.

The second mixing system 2 includes the second chemical solution output pipeline 22, the second diluent output pipeline 21, and the second mixture mixing device 23, and the second manual control valve 221 and the second pneumatic control valve 222 are disposed on the second chemical solution output pipeline 22. The second manual control valve 221 controls the opening and closing of the second chemical solution output pipeline 22 to control whether to input the second chemical solution. The second pneumatic control valve 222 is configured to control the flow of the second chemical solution on the second chemical solution output pipeline 22. The second diluent output pipeline 21 is connected to the second chemical solution output pipeline 22, such that the second diluent and the second chemical solution converge on the second chemical solution output pipeline 22. To avoid liquid backflow, a second check valve 223 is disposed between the second pneumatic control valve 222 and a jointed part between the second diluent output pipeline 21 and the second chemical solution output pipeline 22. The converging second diluent and second chemical solution are transported to the second mixture mixing device 23.

The third mixing system 3 includes the mixing valve 32, the third diluent output pipeline 31, the first mixture output pipeline 321, and the second mixture output pipeline 322. The first mixture output pipeline 321 is communicated with the first mixture mixing device 13, and the second mixture output pipeline 322 is communicated with the second mixture mixing device 23. To monitor a status of the first mixture, for example, pressure and flow, the first pressure sensor 621 and the first flowmeter 631 are successively disposed on the first mixture output pipeline 321 along a transportation direction of the first mixture. To avoid liquid backflow, a third check valve 641 is further disposed in a downstream of the first flowmeter 631. To monitor a status of the second mixture, for example, pressure and flow, the second pressure sensor 622 and the second flowmeter 632 are successively disposed on the second mixture output pipeline 322 along a transportation direction of the second mixture. To avoid liquid backflow, a fourth check valve 642 is further disposed in a downstream of the second flowmeter 632. To monitor a status of the third diluent, for example, pressure and flow, the third pressure sensor 311 and the third flowmeter 312 are successively disposed on the third diluent output pipeline 31 along a transportation direction of the third diluent. To avoid liquid backflow, a fifth check valve 313 is further disposed in a downstream of the third flowmeter 312.

The third diluent output pipeline 31, the first mixture output pipeline 321 and the second mixture output pipeline 322 are communicated with the mixing valve 32.

In the exemplary embodiment shown in FIG. 1, the first diluent, the second diluent, and the third diluent are all deionized water, and the first diluent output pipeline 11, and the second diluent output pipeline 21, and the third diluent output pipeline 31 are communicated with the diluent output pipeline 10 through the pneumatic valve set 101. On the diluent output pipeline 10, a fourth manual control valve 102 and a fourth pressure sensor 103 are successively disposed along an output direction of deionized water. The fourth manual control valve 102 is configured to control turn-on and turn-off of the deionized water. The fourth pressure sensor 103 is configured to monitor pressure of the deionized water. To avoid liquid backflow, a sixth check valve 111 is disposed on the first diluent output pipeline 11, and a seventh check valve 211 is disposed on the second diluent output pipeline 21.

The output system 4 includes the first output pipeline 41, and the third mixture is transported to the spray apparatus 901 of the CMP device 1000 through the first output pipeline 41 to clean the to-be-cleaned semiconductor product. The third pneumatic control valve 42 is disposed on the first output pipeline 41 to control flow of the third mixture in the first output pipeline 41.

The sampling system 5 includes the second output pipeline 51, the second output pipeline 51 is used as a branch pipeline of the first output pipeline 41, one end of the second output pipeline 51 is communicated with the first output pipeline 41, and the other end of the second output pipeline is communicated with the sampler 902. The concentration monitoring unit 61 in the monitoring system 6 is disposed on the second output pipeline 51. To ensure that a status of the third mixture can be monitored in real time, a manual v/v valve 52 is disposed between a jointed part of the second output pipeline 51 and the first output pipeline 41 and the concentration monitoring unit 61. The manual v/v valve 52 can be used for adjusting and controlling flow of the third mixture flowing from the first output pipeline 41 to the second output pipeline 51. The flow can be adjusted and controlled to avoid impact on the third mixture transported on the first output pipeline 41 and complete sample collection and monitoring on the third mixture, to make the second output pipeline 51 only used as a branch pipeline of the first output pipeline 41. In a working state, the manual v/v valve 52 may be in a normally open state. In a case in which the conductivity meter needs to be cleaned, the manual v/v valve 52 may be closed. A fifth manual control valve 53 is further included in a downstream of the concentration monitoring unit 61 to control the opening and closing of the second output pipeline 51.

As shown in FIG. 1, the CMP device 1000 further includes systems for cleaning and leveling a semiconductor product by using mechanical force: a deionized water cleaning system 7 and a cleaning brush cleaning system 8.

The deionized water cleaning system 7 includes a first deionized water output pipeline 71. A fifth pressure sensor 711 and a fifth flowmeter 712 are successively disposed on the first deionized water output pipeline 71 along an output direction of deionized water. The fifth pressure sensor 711 is configured to monitor pressure in the first deionized water output pipeline 71, and the fifth flowmeter 712 is configured to monitor flow in the first deionized water output pipeline 71. The deionized water cleaning system 7 further includes a fifth pneumatic control valve 713 configured to control flow of the deionized water in the deionized water cleaning system 7. The deionized water in the first deionized water output pipeline 71 is output to a deionized water spray apparatus 903 of the CMP device 1000, such that the CMP device 1000 cleans a surface of the semiconductor product with the deionized water.

The cleaning brush cleaning system 8 includes a second deionized water output pipeline 81. A sixth pressure sensor 811 and a sixth flowmeter 812 are successively disposed on the second deionized water output pipeline 81 along an output direction of deionized water. The sixth pressure sensor 811 is configured to monitor pressure in the second deionized water output pipeline 81, and the sixth flowmeter 812 is configured to monitor flow in the second deionized water output pipeline 81. The cleaning brush cleaning system 8 further includes a sixth pneumatic control valve 813 configured to control flow of the deionized water in the cleaning brush cleaning system 8. The deionized water in the second deionized water output pipeline 81 is output to a cleaning brush apparatus 904 of the CMP device 1000, such that the CMP device 1000 cooperates with the cleaning brush apparatus 904 to clean the surface of the semiconductor product with the deionized water.

Figure 4:
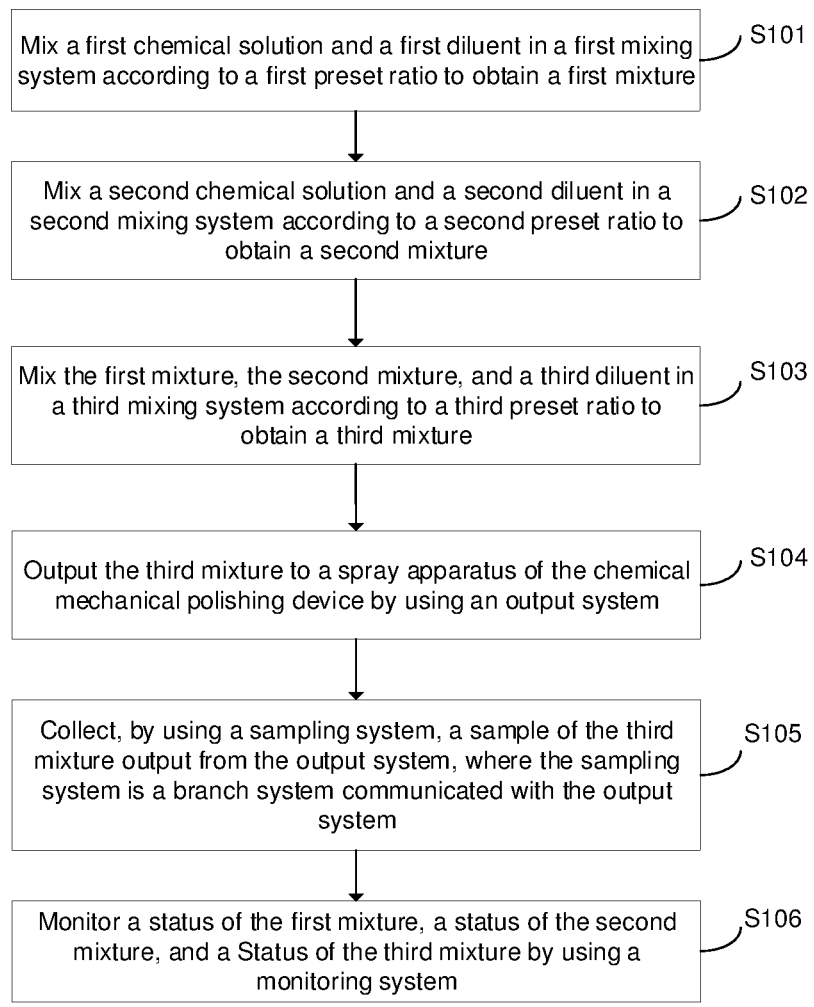
FIG. 4 is a flowchart of an example of a chemical solution preparation method according to the present disclosure.

The present disclosure further provides a chemical solution preparation method. The chemical solution preparation method can be applied to the chemical solution preparation system provided in the present disclosure. FIG. 4 is a flowchart of an example of a chemical solution preparation method according to the present disclosure. The chemical solution preparation method includes the following steps:

Step S101. Mix a first chemical solution and a first diluent in a first mixing system 1 according to a first preset ratio to obtain a first mixture.

Step S102. Mix a second chemical solution and a second diluent in a second mixing system 2 according to a second preset ratio to obtain a second mixture.

Step S103. Mix the first mixture, the second mixture, and a third diluent in a third mixing system 3 according to a third preset ratio to obtain a third mixture.

Step S104. Output the third mixture to a spray apparatus 901 of a CMP device 1000 by using an output system 4.

Step S105. Collect, by using a sampling system 5, a sample of the third mixture output from the output system 4, where the sampling system 5 is a branch system communicated with the output system 4.

Step S106. Monitor statuses of the first mixture, the second mixture, and the third mixture by using a monitoring system 6.

The monitoring system 6 includes a concentration monitoring unit 61; and the monitoring statuses of the first mixture, the second mixture, and the third mixture by using a monitoring system includes:

monitoring a concentration and/or a pH value of the third mixture in the branch system by using the concentration monitoring unit.

The monitoring system 6 includes:

a flow monitoring unit 63, disposed on the third mixing system 3, where the flow monitoring unit 63 includes at least one first flowmeter 631 configured to monitor flow of the first mixture, at least one second flowmeter 632 configured to monitor flow of the second mixture, and at least one third flowmeter 312 configured to monitor flow of the third diluent; and the monitoring statuses of the first mixture, the second mixture, and the third mixture by using a monitoring system includes:

monitoring the flow of the first mixture by using the first flowmeter 631, monitoring the flow of the second mixture by using the second flowmeter 632, and monitoring the flow of the third diluent by using the third flowmeter 312, such that the first mixture, the second mixture, and the third diluent are mixed according to the third preset ratio to obtain the third mixture.

The monitoring system includes:

a pressure monitoring unit 62, disposed on the third mixing system 3, where the pressure monitoring unit 62 includes at least one first pressure sensor 621 configured to monitor pressure of the first mixture, at least one second pressure sensor 622 configured to monitor pressure of the second mixture, and at least one third pressure sensor 311 configured to monitor pressure of the third diluent; and the monitoring statuses of the first mixture, the second mixture, and the third mixture by using a monitoring system includes:

monitoring the pressure of the first mixture by using the first pressure sensor 621, monitoring the pressure of the second mixture by using the second pressure sensor 622, and monitoring the pressure of the third diluent by using the third pressure sensor 311.

To accurately monitor the concentration and/or the pH value of the third mixture, the monitoring can be conducted after the concentration and/or the pH value of the third mixture are/is relatively stable. As described above, as shown in FIG. 3, the concentration and/or the pH value of the third mixture shown after a dotted line a01 can be monitored to determine whether the concentration and/or the pH value of the third mixture are/is always within a preset range of the concentration and/or the pH value. If the concentration and/or the pH value of the third mixture are/is always within the preset range of the concentration and/or the pH value, it indicates that the concentration and/or the pH value of the third mixture satisfy/satisfies a cleaning requirement and the third mixture can continue to be used for cleaning a to-be-cleaned semiconductor product. If the concentration and/or the pH value of the third mixture are/is not always within the preset range of the concentration and/or the pH value, it indicates that the concentration and/or the pH value of the third mixture do/does not satisfy the cleaning requirement and the third mixture cannot continue to be used for cleaning the to-be-cleaned semiconductor product. In this case, an alarm prompt is given to indicate a reason why the chemical solution preparation system needs to be shut down to conduct inspection. Therefore, in the chemical solution preparation method provided in the present disclosure, the monitoring a concentration and/or a pH value of the third mixture in the branch system by using the concentration monitoring unit includes:

determining whether a chemical solution system is in a preset state; if the chemical solution system is in the preset state, monitoring the concentration and/or the pH value of the third mixed solution in the branch system by using the concentration monitoring unit;

determining whether the concentration and/or the pH value of the third mixture are/is within a preset range; and if the concentration and/or the pH value of the third mixture are/is not within the preset range, indicating, in a preset manner, that the concentration and/or the pH value of the third mixture are/is not within the preset range.

The preset state of the chemical solution system may be any state that indicates that the concentration and/or the pH value of the third mixture prepared in the chemical solution system are/is already in a relatively stable state, for example, a state shown after the dotted line a01 shown in FIG. 3. For example, whether the concentration and/or the pH value of the third mixture are/is always within the preset range is monitored after the chemical solution preparation is conducted for a preset period of time, or within a given period of time.

The preset range of the concentration and/or the pH value of the third mixture may be a related range of the concentration and/or the pH value that satisfies the cleaning requirement. For example, the preset range may be a range of values floating up and down around an optimal concentration value by 5% and/or a range of values floating up and down around an optimal pH value by 5%.

In the exemplary embodiments provided in the present disclosure, FIG. 1 and FIG. 4 show the chemical solution preparation system and method in which two chemical solutions are used. This does not constitute any limitation on the present disclosure. The chemical solution system and method provided in the present disclosure may include a chemical solution preparation system and method that are provided according to the foregoing mixture preparation system and method and in which more than two chemical solutions are used.

Each embodiment or implementation in the specification is described in a progressive manner. Each embodiment focuses on the difference from other embodiments, and for the same and similar parts between the embodiments, mutual reference may be made.

In the descriptions of this specification, a description with reference to the term "embodiment", "exemplary embodiment", "some implementations", "an exemplary implementation", "an example", and the like means that a specific feature, structure, material, or characteristic described in combination with the implementation(s) or example(s) is included in at least one implementation or example of the present disclosure.

In this specification, the schematic expression of the above terms does not necessarily refer to the same implementation or example. Moreover, the described specific feature, structure, material, or characteristic may be combined in an appropriate manner in any one or more implementations or examples.

It should be understood that, in the descriptions of the present disclosure, orientations or position relationships indicated by terms such as "center", "upper", "lower", "left", "right", "vertical", "horizontal", "inside", and "outside" are orientations or position relationships based on illustrations in the accompanying drawings. The terms are merely intended to facilitate and simplify the descriptions of this application, but are not intended to indicate or imply that an indicated apparatus or element needs to have a particular orientation and needs to be constructed and operated in a particular orientation, and therefore cannot be construed as a limitation on the present disclosure.

It can be understood that the terms "first", "second", and the like used in the present disclosure can be used to describe various structures in the present disclosure, but these structures are not limited by these terms. These terms are only used to distinguish a first structure from another structure.

In one or more drawings, same components are represented by similar reference numerals. For clarity, various parts in the accompanying drawings are not drawn to scale. In addition, some well-known parts may not be shown. For brevity, a structure obtained after several steps are implemented may be described in one figure. In the following, many specific details in the present disclosure are described, for example, a structure, a material, and a dimension of a device, and a processing process and a technology for the device, to understand the present disclosure more clearly. However, as persons skilled in the art can understand, the present disclosure may not be implemented according to these specific details.

Finally, it should be noted that the above embodiments are merely intended to describe the technical solutions of the present disclosure, rather than to limit the present disclosure. Although the present disclosure is described in detail with reference to the above embodiments, persons skilled in the art should understand that they may still make modifications to the technical solutions described in the above embodiments or make equivalent replacements to some or all technical features thereof, without departing from the scope of the technical solutions in the embodiments of the present disclosure.

INDUSTRIAL APPLICABILITY

In the chemical solution preparation system and method provided in the embodiments of the present disclosure, the sampling system is disposed in a form of a branch system to collect a sample of a mixture for cleaning a to-be-cleaned semiconductor product, so as to learn parameter information related to components in the mixture in time to adjust the components in the mixture in time. The mixture is monitored to learn a concentration and/or a pH value of the mixture in time to determine whether the concentration and/or the pH value of the mixture satisfy/satisfies the cleaning requirement. This improves the accuracy of preparing a chemical solution by the CMP device, thereby improving a product yield.

The invention claimed is:

1. A chemical solution preparation system, wherein
the chemical solution preparation system is disposed inside a chemical mechanical polishing device, and comprises:
a first mixing system, configured to mix a first chemical solution and a first diluent according to a first preset ratio to obtain a first mixture;

a second mixing system, configured to mix a second chemical solution and a second diluent according to a second preset ratio to obtain a second mixture;

a third mixing system, connected to the first mixing system and the second mixing system, respectively, wherein the third mixing system is configured to mix the first mixture, the second mixture, and a third diluent according to a third preset ratio to obtain a third mixture;

an output system, configured to output the third mixture to a spray apparatus of the chemical mechanical polishing device;

a sampling system, configured to collect a sample of the third mixture output from the output system, wherein the sampling system is a branch system communicated with the output system; and a monitoring system, configured to monitor a status of the first mixture, a status of the second mixture, and a status of the third mixture, wherein the monitoring system comprises a concentration monitoring unit disposed on the branch system, and one end of the concentration monitoring unit communicated with the output system, and the other end communicated with the sampling system.

2. The chemical solution preparation system according to claim 1, wherein
the concentration monitoring unit comprises:
a multi-way adapter, disposed on the branch system and communicated with the branch system;
a conductivity meter, inserted into the multi-way adapter to monitor at least one of a concentration or a pH value of the third mixture in the branch system; and
a display, electrically connected to the conductivity meter, and configured to display a monitoring result of the conductivity meter.

3. The chemical solution preparation system according to claim 1, wherein
the monitoring system comprises:
a pressure monitoring unit, disposed on the third mixing system, wherein the pressure monitoring unit comprises at least one first pressure sensor configured to monitor pressure of the first mixture, at least one second pressure sensor configured to monitor pressure of the second mixture, and at least one third pressure sensor configured to monitor pressure of the third diluent; and
a flow monitoring unit, disposed on the third mixing system, wherein the flow monitoring unit comprises at least one first flowmeter configured to monitor a flow of the first mixture, at least one second flowmeter configured to monitor a flow of the second mixture, and at least one third flowmeter configured to monitor a flow of the third diluent.

4. The chemical solution preparation system according to claim 1, wherein
the output system comprises a first output pipeline, one end of the first output pipeline is communicated with the third mixing system, and the other end of the first output pipeline is communicated with the spray apparatus; and
the sampling system comprises a second output pipeline, one end of the second output pipeline is communicated with the first output pipeline, the other end of the second output pipeline is communicated with a sampler, and a valve is disposed on the second output pipeline, wherein the second output pipeline is a branch pipeline of the first output pipeline.

5. The chemical solution preparation system according to claim 1, wherein
the first diluent, the second diluent, and the third diluent each are deionized water.

6. The chemical solution preparation system according to claim 3, wherein
the first mixing system comprises a first diluent output pipeline, a first chemical solution output pipeline, and a first mixture mixing device;
a first manual control valve and a first pneumatic control valve are successively disposed on the first chemical solution output pipeline along a flow direction of the first chemical solution; and
the first diluent output pipeline and the first chemical solution output pipeline are communicated with the first mixture mixing device.

7. The chemical solution preparation system according to claim 6, wherein
the second mixing system comprises a second diluent output pipeline, a second chemical solution output pipeline, and a second mixture mixing device;
a second manual control valve and a second pneumatic control valve are successively disposed on the second chemical solution output pipeline along a flow direction of the second chemical solution; and
the second diluent output pipeline and the second chemical solution output pipeline are communicated with the second mixture mixing device.

8. The chemical solution preparation system according to claim 7, wherein
the third mixing system comprises a third diluent output pipeline and a mixing valve;
the mixing valve is communicated with the third diluent output pipeline;
the mixing valve is communicated with the first mixture mixing device and the second mixture mixing device; and
the mixing valve is communicated with the output system.

9. The chemical solution preparation system according to claim 8, wherein
when the first diluent, the second diluent, and the third diluent are the same, the first diluent output pipeline, the second diluent output pipeline, and the third diluent output pipeline are communicated with a diluent output pipeline through a pneumatic valve set; and a third manual control valve is disposed on the diluent output pipeline.

10. The chemical solution preparation system according to claim 8, wherein
the mixing valve is communicated with the first mixture mixing device through a first mixture output pipeline;
the mixing valve is communicated with the second mixture mixing device through a second mixture output pipeline;
the first pressure sensor and the first flowmeter are successively disposed on the first mixture output pipeline along a transportation direction of the first mixture;
the second pressure sensor and the second flowmeter are successively disposed on the second mixture output pipeline along a transportation direction of the second mixture; and
the third pressure sensor and the third flowmeter are successively disposed on the third diluent output pipeline along a transportation direction of the third diluent.

11. A chemical solution preparation method, the chemical solution preparation method comprising:

mixing a first chemical solution and a first diluent in a first mixing system according to a first preset ratio to obtain a first mixture;

mixing a second chemical solution and a second diluent in a second mixing system according to a second preset ratio to obtain a second mixture;

mixing the first mixture, the second mixture, and a third diluent in a third mixing system according to a third preset ratio to obtain a third mixture;

outputting the third mixture to a spray apparatus of a chemical mechanical polishing device by using an output system;

collecting, by using a sampling system, a sample of the third mixture output from the output system, wherein the sampling system is a branch system communicated with the output system; and monitoring a status of the first mixture, a status of the second mixture, and a status of the third mixture by using a monitoring system, wherein the monitoring system comprises a concentration monitoring unit disposed on the branch system, and one end of the concentration monitoring unit communicated with the output system, and the other end communicated with the sampling system.

12. The chemical solution preparation method according to claim 11, wherein the monitoring the status of the first mixture, the status of the second mixture, and the status of the third mixture by using the monitoring system comprises:

monitoring at least one of a concentration or a pH value of the third mixture in the branch system by using the concentration monitoring unit.

13. The chemical solution preparation method according to claim 11, wherein the monitoring system comprises:

a flow monitoring unit, disposed on the third mixing system, wherein the flow monitoring unit comprises at least one first flowmeter configured to monitor a flow of the first mixture, at least one second flowmeter configured to monitor a flow of the second mixture, and at least one third flowmeter configured to monitor a flow of the third diluent; and the monitoring the status of the first mixture, the status of the second mixture, and the status of the third mixture by using the monitoring system comprises:

monitoring the flow of the first mixture by using the first flowmeter, monitoring the flow of the second mixture by using the second flowmeter, and monitoring the flow of the third diluent by using the third flowmeter, such that the first mixture, the second mixture, and the third diluent are mixed according to the third preset ratio to obtain the third mixture.

14. The chemical solution preparation method according to claim 13, wherein the monitoring system comprises:

a pressure monitoring unit, disposed on the third mixing system, wherein the pressure monitoring unit comprises at least one first pressure sensor configured to monitor a pressure of the first mixture, at least one second pressure sensor configured to monitor a pressure of the second mixture, and at least one third pressure sensor configured to monitor a pressure of the third diluent; and the monitoring the status of the first mixture, the status of the second mixture, and the status of the third mixture by using the monitoring system comprises:

monitoring the pressure of the first mixture by using the first pressure sensor, monitoring the pressure of the second mixture by using the second pressure sensor, and monitoring the pressure of the third diluent by using the third pressure sensor.

15. The chemical solution preparation method according to claim 12, wherein the monitoring the at least one of the concentration or the pH value of the third mixture in the branch system by using the concentration monitoring unit comprises:

determining whether a chemical solution system is in a preset state; if the chemical solution system is in the preset state, monitoring the at least one of the concentration or the pH value of the third mixture in the branch system by using the concentration monitoring unit;

determining whether the at least one of the concentration or the pH value of the third mixture are/is within a preset range; and if the at least one of the concentration or the pH value of the third mixture are/is not within the preset range, indicating, in a preset manner, the at least one of the concentration or the pH value of the third mixture is not within the preset range.

16. The chemical solution preparation system according to claim 2, wherein the monitoring system comprises:

a pressure monitoring unit, disposed on the third mixing system, wherein the pressure monitoring unit comprises at least one first pressure sensor configured to monitor pressure of the first mixture, at least one second pressure sensor configured to monitor pressure of the second mixture, and at least one third pressure sensor configured to monitor pressure of the third diluent; and a flow monitoring unit, disposed on the third mixing system, wherein the flow monitoring unit comprises at least one first flowmeter configured to monitor a flow of the first mixture, at least one second flowmeter configured to monitor a flow of the second mixture, and at least one third flowmeter configured to monitor a flow of the third diluent.

17. The chemical solution preparation system according to claim 1, wherein the chemical solution preparation system further comprises:

a deionized water cleaning system, configured to output deionized water to a deionized water spray apparatus of the chemical mechanical polishing device;

a cleaning brush cleaning system, configured to output deionized water to a cleaning brush apparatus of the chemical mechanical polishing device;

wherein the first mixing system, the second mixing system, the third mixing system, the deionized water cleaning system, and the cleaning brush cleaning system are all communicated with a diluent output pipeline through a pneumatic valve set.

* * * * *